(12) United States Patent
Merle

(10) Patent No.: US 8,656,816 B2
(45) Date of Patent: Feb. 25, 2014

(54) PEELING TOOL

(75) Inventor: Bernd Merle, Alsfeld (DE)

(73) Assignee: PF Schweiβtechnologie GmbH, Karl-Bröger-Straβe (DE)

( * ) Notice: Subject to any disclaimer, the term of this patent is extended or adjusted under 35 U.S.C. 154(b) by 195 days.

(21) Appl. No.: 13/268,029

(22) Filed: Oct. 7, 2011

(65) Prior Publication Data
US 2012/0085207 A1    Apr. 12, 2012

(30) Foreign Application Priority Data
Oct. 7, 2010   (DE) .......................... 10 2010 047 859

(51) Int. Cl.
B23B 5/12   (2006.01)
B23D 21/00   (2006.01)

(52) U.S. Cl.
USPC .............................................. 82/113; 82/70.2

(58) Field of Classification Search
USPC ............. 407/113, 29.13, 35, 43; 82/70.2, 113
See application file for complete search history.

(56) References Cited

U.S. PATENT DOCUMENTS

| | | | | |
|---|---|---|---|---|
| 2,815,686 A | * | 12/1957 | Harrison et al. | 76/37 |
| 2,925,644 A | * | 2/1960 | Barggren | 29/76.1 |
| 6,213,694 B1 | * | 4/2001 | Ichikawa | 409/139 |
| 6,698,321 B2 | * | 3/2004 | Oswald | 82/113 |
| 7,337,698 B2 | * | 3/2008 | DiBiase et al. | 82/70.2 |
| 7,410,330 B1 | * | 8/2008 | Tsai | 407/35 |
| 7,954,523 B2 | * | 6/2011 | Liu | 144/218 |
| 2003/0039517 A1 | | 2/2003 | Golding, III | |
| 2003/0077130 A1 | | 4/2003 | Klesser | |

FOREIGN PATENT DOCUMENTS

| | | |
|---|---|---|
| DE | 10 2008 018 079 B4 | 11/2009 |
| EP | 1 112 794 A2 | 7/2001 |
| JP | 60-238210 A | 11/1985 |

OTHER PUBLICATIONS

JP 60-238210 A—English abstract obtained from Espacenet (http://worldwide.espacenet.com) accessed on Feb. 10, 2012, 1 page.
EP 1 112 794 A2—English abstract obtained from Espacenet (http://worldwide.espacenet.com) accessed on Feb. 10, 2012, 1 page.
DE 10 2008 018 079 A1—Abstract and machine translation obtained from Espacenet (http://worldwide.espacenet.com) accessed on Feb. 10, 2012, 2 pages.

* cited by examiner

*Primary Examiner* — Will Fridie, Jr.
(74) *Attorney, Agent, or Firm* — Hahn Loeser & Parks LLP

(57) ABSTRACT

A peeling tool designed for at least partially stripping the outer peripheral surface of rotationally symmetric objects, in particular cylindrical plastic pipes, with the peeling tool featuring a peeling head with a drive shaft having a longitudinal axis and coaxially to this drive shaft arranged cylindrical blade roller. The cylindrical blade roller moves with the drive shaft. The peeling tool also featuring at least one peeling blade inside the blade roller with the peeling blade having a cutting edge which extends beyond the blade roller surface and defines the maximum outer diameter of the peeling head. The peeling tool also features two cylindrical guide elements with longitudinal axes, which are mounted to the face sides of the blade roller in a coaxial arrangement.

13 Claims, 4 Drawing Sheets

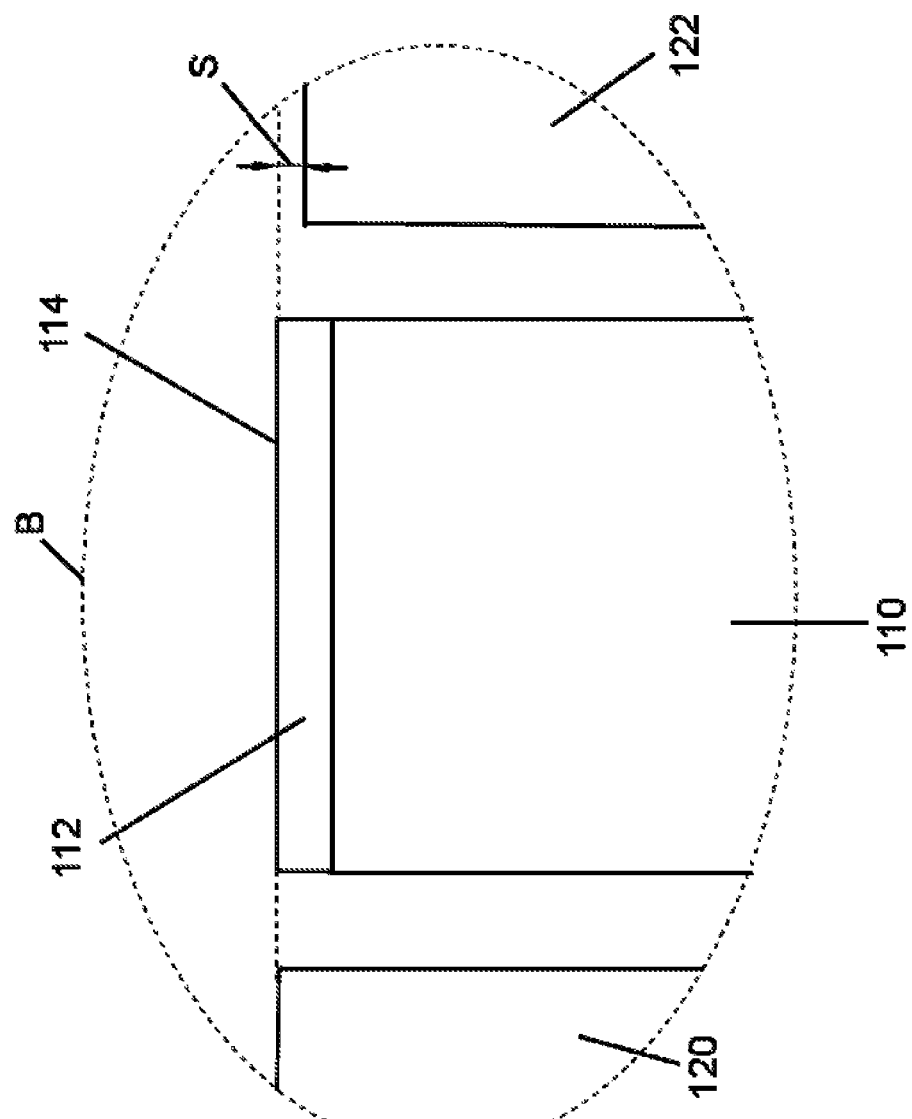

PEELING TOOL

This application claims priority to, and the benefit of, German Patent Application No. 10 2010 047 859.8 filed Oct. 7, 2010, which is hereby incorporated by reference.

FIELD OF THE INVENTION

The present invention refers to the invention of a peeling tool. According to the preamble of claim 1, the purpose of the invented tool is to at least partially strip the outer surface layers of rotationally symmetric objects, in particular cylindrical plastic pipes.

The present invention in particular pertains to the invention of a peeling tool for the at least partial stripping of the outer surface layers of rotationally symmetric objects, in particular cylindrical plastic pipes with the peeling tool having a peeling head (also called skiver head) with a drive shaft having a direct longitudinal axis and coaxially arranged cylindrical blade rollers that rotate with the drive shaft and with at least one peeling blade extending beyond the blade roller surface defining the maximum circumference of the peeling head, with the extending blade having a linear cutting edge and being arranged at least approximately parallel to the direct longitudinal axis of the blade roller.

BACKGROUND OF THE INVENTION

It is common practice to pretreat rotationally symmetrical work pieces like cylindrical plastic pipes, before adjoining several of them or before joining other formed parts to them, such as T-joints or crosspieces e.g. via heated coil fittings through coil welding. The pretreatment is designed to achieve a more secure and/or leak-proof joint. Plastic pipes may be used to transport media like water or gases. Quite a large number of pipes need to be joined to create a transport network. The pipes are joined by welding or splicing, or they are fit together using pipe couplings or collars.

It is also common practice to fit existing pipelines with saddle junctions for inlets and outlets. This too requires a special pipe preparation before the saddle joint can be welded or spliced onto the pipe. The pipe surface must be cleaned, and it is then especially important to remove the oxidized layer and create a smooth and plane surface free of scratches and gouges, which would negatively impact the quality of the welded or glued joints and with it the durability and leak tightness.

Saddle joints are usually not placed close to the end of a pipe but rather in arbitrary places in the length of the pipe. Peeling devices like the bell-shaped peeling tool described in utility patent DE 296 12 668 are therefore not suitable. Other known peeling tools can be applied anywhere along the length of a pipe, but they are designed to strip the outer layer of the pipe around the entire pipe circumference.

Patent DE 100 27 316 describes such a peeling device. This device features a bearing shell in which the pipe is placed for the surface treatment. A peeling blade opposite the bearing shell can be manually moved along a spindle toward the pipe. Once the peeling blade touches the pipe, the peeling device is moved around the longitudinal axis of the pipe.

Peeling devices such as the one described above peel the entire circumference of a pipe and are therefore only of limited use in the preparation of pipes for the attachment of saddle joints, which at most span half of the pipe. Not only is the preparation of the entire pipe circumference unnecessary, leaving the pipe partially stripped bare is also going to weaken the pipe and reduce its useful life. In the above described peeling device, the full circumference of the pipe must be stripped because the bearing shell is located on top of the peeling blade on the opposite side of the pipe. In construction, it is usually not possible or sensible to expose the entire circumference of a pipe.

BRIEF SUMMARY OF THE INVENTION

The objective of this invention is to offer a peeling tool without the above described disadvantages, which enables the safe and effective attachment of saddle joints to pipe surfaces.

The characteristics of claim 1 meet the above objective. The following claims 2 through 11 characterize advantageous embodiments of the invention.

The abovementioned objective is met in particular by the peeling tool for the at least partial stripping of the outer surface layers of rotationally symmetric objects, in particular cylindrical plastic pipes, with the peeling tool having a peeling head (also called skiver head) with a drive shaft having a direct longitudinal axis and coaxially arranged cylindrical blade rollers that rotate with the drive shaft and with at least one peeling blade extending beyond the blade roller surface, which defines the maximum circumference of the peeling head.

The design for a particular embodiment of the invented peeling tool features two cylindrical guide elements with longitudinal direct axes, which are attached coaxially to the face sides of the blade rollers. Using these guides, the peeling tool can be exactly positioned alongside any desired pipe location.

Furthermore, the invention requires the first guide element to have a diameter equal to the maximum outer diameter of the peeling head, while the second guide element has a diameter, which is by twice the peeling depth smaller than the first guide element. The peeling depth is equal to the layer of material, which is stripped off the surface of the rotationally symmetrical object. In this guide element design, the second guide always rests on the unpeeled pipe surface while the first guide rests on the already peeled surface. In this design, the edge of the peeling blade remains parallel to the pipe surface or the longitudinal axis of the pipe. This ensures that the pipe is evenly stripped of unwanted material over the entire work surface.

Another embodiment achieves a friction-free and therefore even more accurate control of the peeling tool. In this embodiment, the first and second guide element pivot around the longitudinal axis independent of the blade rollers, thus allowing the guides to roll on the pipe surface. This rolling motion is achieved by allowing the first and second guide element to pivot on the drive shaft.

The guide elements act as stable supports on both sides of the blade rollers. The blade rollers can therefore be wider than the guide elements. This increases the effective work surface of the peeling tool.

The guide elements and the blade rollers are made of metal. Using metal is advantageous because it minimizes wear and tear and increases the stability of the peeling tool.

For the purpose of assuring occupational health and safety the design also calls for a blade roller cover parallel to the blade roller surface. The cover should almost completely shield the blade rollers and the guide elements in axial direction; the cover should at least also protect a section of the circumference. Such a shield protects the peeling tool user from flying shavings, and it also prevents the user from inadvertently touching the moving blade rollers. The cover may be adjustable around the circumference so that the work area can be ergonomically adjusted to e.g. different users and various work conditions.

In a particular embodiment of the invention, the drive shaft has a first end with an adapter for the connection to a drive mechanism. This adapter allows the operator to connect any available drive to the peeling tool.

An electromotor is particularly suitable for use with the peeling tool. Alternatively, operators may also use the drives of electrical devices such as angle grinders or drills.

In another embodiment of the invention, the drive shaft features a second end with a bearing element, in which the drive shaft can rotate.

In order to keep the bearing element from rotating whenever the peeling tool is used, the invention includes a torque support, which allows it to lock the bearing element in position on the drive shaft frame. The torque support may also serve as a handle.

The invention may also include a handle for the bearing element for the more convenient handling of the peeling tool. The handle can also help to align the peeling tool with the pipe axis.

BRIEF DESCRIPTION OF THE DRAWINGS

More advantageous design elements and an example embodiment are described in detail below in context with the description of the embodiment with the respective drawings. In the embodiment description we used the descriptive terms 'top', 'bottom', 'right' and 'left'. They refer to the drawn figures in the orientation, which renders the reference signs and figure names readable. The figures show the following objects.

DETAILED DESCRIPTION OF THE INVENTION

Figure 1:
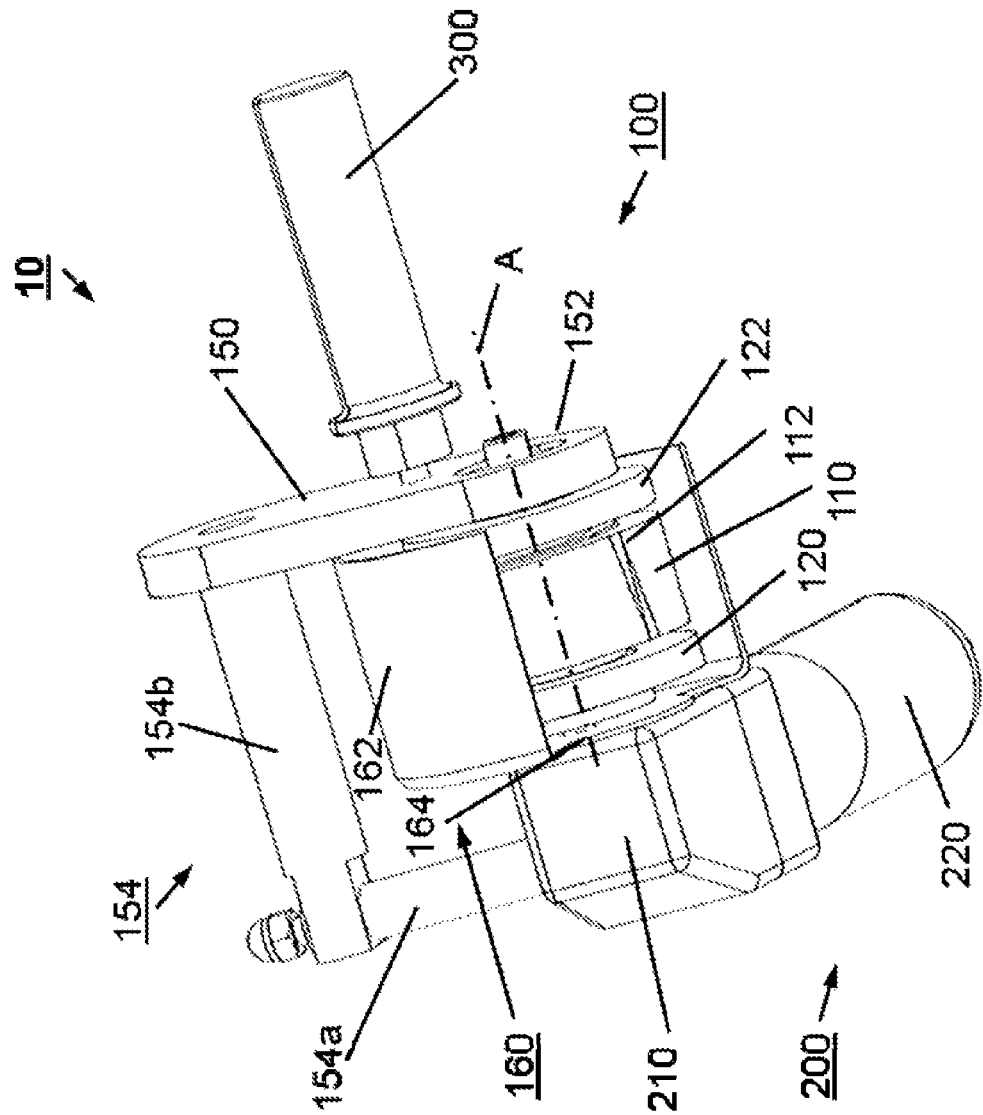
FIG. 1: a foreshortened view of an embodiment of the invented peeling tool

FIG. 1 shows a foreshortened view of the invented peeling tool 10 with the peeling head 100 and the drive 200.

FIG. 1 also shows the peeling head 100 with the blade roller assembly 110 containing the peeling blades 112 (only one blade is visible in FIG. 1). The cylindrical guide elements 120 and 122 are placed right and left of the blade roller. The surfaces of the guide elements 120, 122 are arranged parallel to and at a distance from the front faces of the blade roller. The guide elements and the blade roller 110 are arranged coaxially. The blade roller 110 and the guide elements 120, 122 are mounted on a drive shaft 130, which is not visible here. The first end (132, left end in FIG. 1) of the drive shaft is connected via the adapter 140 (not visible in FIG. 1) to the drive 200. The second end 134 of the drive shaft 130 rotates inside the bearing 152 in the bearing element 150.

The drive side 200 features a miter gear inside the casing 210 with the adapter 140 attached to the output side. The drive unit 220, in this instance an electric motor, is flange-mounted to the drive side of the miter gear, or the drive side wall of the casing 210, respectively.

The torque support 154 features a vertical stud 154a and a connecting bar 154b. The vertical stud is connected to the casing 210 of the drive 200. The connecting stud is mounted parallel to the drive shaft 130; one end of the stud is mounted to the bearing element (150) and the other end connects to the vertical stud 154a.

The handle 300 is attached to the side of the bearing element 150, which points away from the peeling head 10. In this arrangement, the almost cylindrically shaped handle is positioned parallel to the drive shaft 130.

The cover 160 consists of two sections. The first section 162 bends around the blade roller in equal distance. The second section 164 covers the area between the guide element 120 and the casing part 210. Section 162 covers about two thirds of the blade roller 110 surface, i.e. a circle sector of about 240°. The uncovered part of the blade roller constitutes the effective work area of the peeling tool 10.

Figure 2:
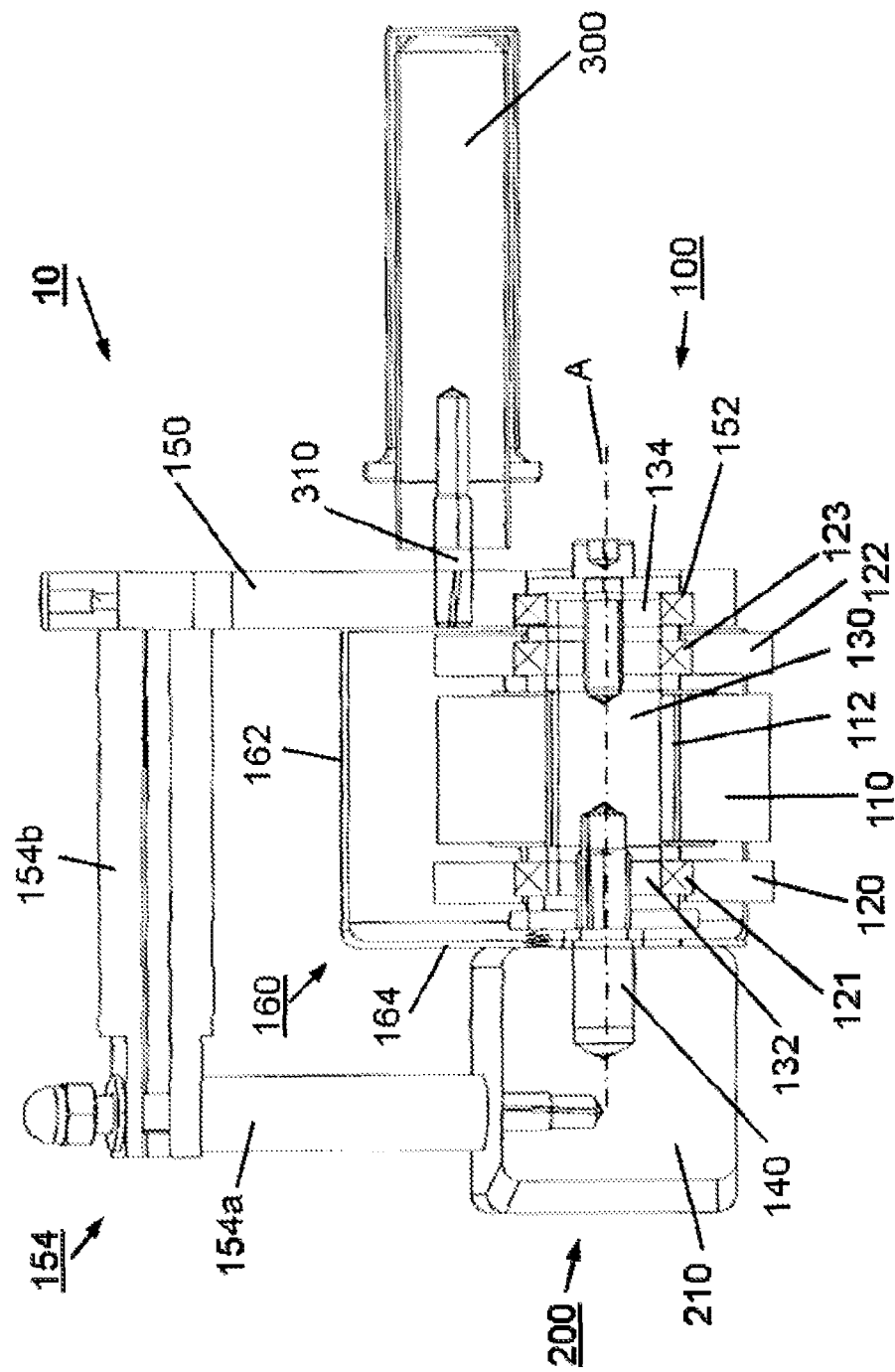
FIG. 2: the sectional view along the longitudinal axis of the drive shaft in the embodiment according to FIG. 1

FIG. 2 shows the section along the longitudinal axis A 130 of the drive shaft (130) depicted in FIG. 1.

As shown in FIG. 2, the blade roller 110 is located on the drive shaft 130. The blade roller 110 and the drive shaft 130 are connected in the usual way so that they rotate together. This type of connection for the purpose of co-rotating the blade roller and the drive shaft may conceivably be a shrink connection or a tongue-and-groove system. Spaced right and left of the blade shaft 110, the guide elements 120, 122 are coaxially arranged on the drive shaft. In this design, the bearings 121, 123 hold the pivotable guide elements 120, 122 on the drive shaft 130. The guide elements 120, 122 have longitudinal axes, which coincide with the axis of the drive shaft 130. For the sake of clarity, the guide element axes are not shown or identified in the drawings.

Running coaxially with the longitudinal axis A, threaded holes are drilled into the facing ends of the drive shaft 130. Adapter 140 is screwed into the predrilled thread in the first or left end 132 of the drive shaft. The cylindrical adapter 140 therefore has the male part of the threaded joint (shown on the right side of the adapter in FIG. 2). There is a male thread on the other side of the adapter 140 as well. This second thread makes it possible to connect the adapter with the drive 200. The adapter 140 itself is mounted using the spanner flat midway between the two threads.

The lower edge of the bearing element 150 (depicted in FIG. 2) is mounted on the right or second end 134 of the drive shaft 130 using bearing 152. The bearing element 150 is able to rotate. As described before in the legend to FIG. 1, the right end of the horizontal connecting bar 154b of the torque support 154 is rigidly connected to the upper edge of the bearing element 150. This can be a threaded connection as shown in FIG. 2.

The lower part of the vertical stud 154a is connected to the drive casing 210 and the top part is connected to the horizontal connecting bar 154b. The torque support 150 prevents the rotation of bearing element 150 when the drive shaft 130 is in motion. In the depicted embodiment as well as in modified embodiments, the torque support 154 may also be used as a handle and guide for the peeling tool 10. Another handle 300 is mounted to the side of the bearing element 150 and points away from the peeling head 100. The handle 300 features a threaded bolt 310 on the side facing bearing element 150. This threaded bolt is used to screw the handle 300 into the respective threaded hole in the bearing element 150. The cylindrically shaped handle 300 is aligned parallel with the longitudinal axis of the blade roller 110.

Figure 3:
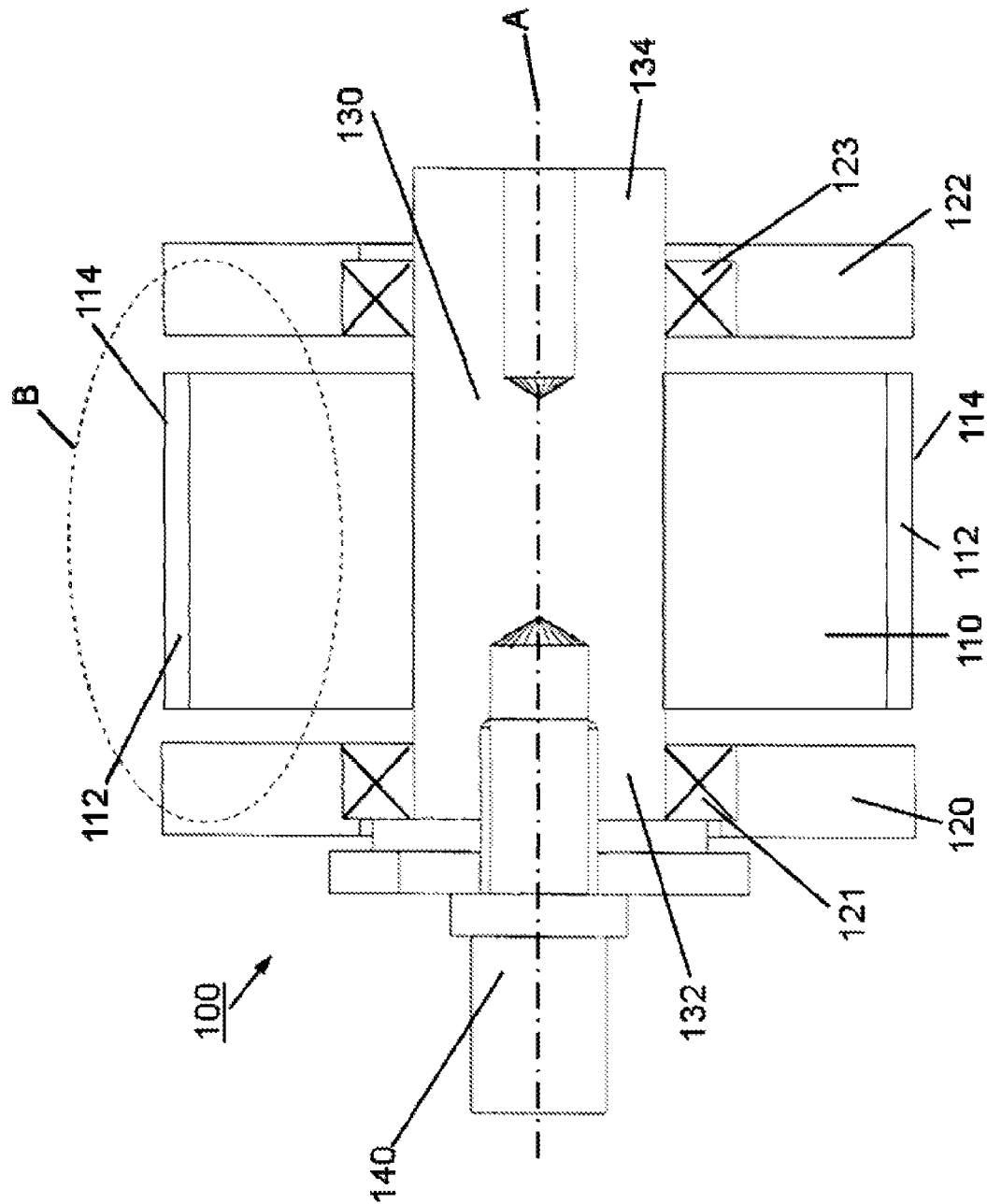
FIG. 3: a sectional view of the peeling head in the cutting plane according to FIG. 2 and FIG. 4: detail from Fig.

FIG. 3 shows a sectional view of the peeling head in the sectional plane according to FIG. 2. For the sake of clarity, only the essential elements of the peeling head are included in the drawing. The core component of the peeling head 100 is the cylindrical drive shaft 130 with the threaded holes in its faces on the right 132 and on the left 134 side. The threaded holes run in the same direction as the longitudinal drive shaft axis A. The blade shaft 110 is placed approximately in the middle of the drive shaft and turns with the drive shaft 130. The guide elements 120, 122 rotate around the blade roller with some clearance. Using the bearings 121 and 123, the guide elements are mounted on the drive shaft 130 and turn with it.

The blade roller 110 in the embodiment depicted in FIG. 3 features two opposite peeling blades 112, which extend above the cylindrical blade roller surface 130. These two wider blades have outer edges with linear cutting edges 114; they define the maximum diameter of the peeling head. The cutting edges are arranged parallel to the longitudinal axis A of the drive shaft 130. The diameter of guide element 120 matches the maximum diameter of the peeling head 100. As shown in the detail drawing B, the diameter of guide element 122 is by twice the peeling depth S smaller than guide element 120. This means that the difference in the guide element radius equals the thickness of the material to be stripped.

FIG. 3 also shows the adapter 140. The external thread at the right end of this adapter is screwed into the respective bore hole inside the left end 132 of the drive shaft 130. A circular collar around the middle of adapter 140 and some washers (not described in detail) form the limit stop for bearing 121.

FIG. 4 shows detail B in FIG. 3. The diameter of the left guide element 120 is equal to the maximum diameter of the blade roller 110 as defined by the cutting edge 114 of the larger peeling blade 112 in the peeling head 100. The diameter of the right guide element 122 is smaller by twice the peeling depth. The peeling depth is equal to the maximum radius of guide element 120 minus the radius of guide element 122 as shown in FIG. 4.

The peeling tool 10 is used to prepare a pipe e.g. for the attachment of a distributary branch via a saddle piece seated on top of the pipe. This tributary line is usually connected at a distance from the end of the pipe. The pipe preparation involves the removal of scratches, gouges or oxide layers as necessary.

For the peeling process the peeling tool is guided around the piece of pipe to be modified. The user holds the peeling tool 10 by its handle 300 and the drive 200. For better handling and stability, the user pulls the peeling tool toward him while the blade rollers peel a strip of the pipe, which is equal in size to the width of the blade roller 110 or the length of the peeling blade 112. The peeling tool handle 300 extends parallel to the drive shaft 130 and can therefore be used to align the peeling tool 10 with the pipe in axial direction. Peeling in this context means stripping material off the outer pipe surface. Usually, several strips of pipe need to be peeled, dependent on the width of the prepared pipe section required for the project.

Due to the diameter difference between the guide elements 120 and 122, the user first peels a strip around the pipe surface with an approximately triangular profile. The deepest point in this triangular profile is the desired peeling depth S. In order to peel the next strip around the pipe, the peeling tool 10 is now seated on the pipe in such a way that the left guide element 120 rests in the peeled section while the right guide element 122 still rolls on the pipe section, which is still to be peeled. Given the above described diameters of the guide elements 120 and 122 in combination with the maximal diameter of the peeling head 100, the user can now be certain that the cutting edge 114 of the peeling blade 112 is always oriented parallel to the pipe surface and will therefore peel an even layer of material off the pipe, thus creating a smooth peeled pipe surface.

The user peels successive strips of pipe as described above, until a long enough section of the pipe is peeled for the attachment of the saddle joint. It goes without saying that the movement of the peeling tool around the circumference of the pipe determines how large an angle is subtended by the peeled arc (or how far around the pipe the peeling tool was guided). The user may decide to only peel a very small arc around the pipe or to peel the entire circumference of the pipe. The saddle joint can then be attached to the pipe as desired either by welding, gluing or splicing.

Usually, the peeling depth is about 0.2 mm. However, the user may decide on other peeling depths as the situation requires. Some large pipes may show very scarred or damaged surfaces. Peeled surfaces can be peeled once again in case there are still scratches or gouges, which may cause leaky joints. Of course, the pipe walls should not be peeled to an impermissibly low strength.

In FIG. 1, the invented peeling tool 10 is powered by the electric motor of an angle grinder. Here the drive 200 is tilted by 90° with the drive shaft 130 as reference. This reduces the total width of the peeling tool 10, which can now also be used in very tight spaces. Of course, angles other than a 90° angle between the drive shaft 130 and drive 200 can be created using suitable gear train assemblies. This may make it easier to handle the peeling tool 10 or improve the ergonomic conditions when using the hand-held tool.

Alternatively, the user can also connect other drives to the peeling tool, such as a drill or another motor with a coaxial drive 130 or at least with a drive parallel to the drive shaft 130.

In case of stationary use, it is also feasible to connect the peeling tool 10 to a flexible shaft, which is coupled to a stationary drive.

In the above described embodiment example of the invention, the diameter of the left guide element 120 is equal to the maximum diameter of the peeling head 100, while the diameter of the right guide element 122 was by twice the peeling depth smaller than the left guide element 120. The reverse is also possible; the diameter of guide element 122 may be equal to the maximum diameter of the peeling head 100 while the guide element 120 is smaller.

Alternatively, the guide elements 120, 122 may have identical diameters. The peeling tool 10 may then be used for precision peeling. Any and all uneven spots on the pipe surface are removed when the diameters of both guide elements are identical to the maximum diameter of the peeling head 100. The result is a precisely even pipe surface.

With the diameters of the guide elements 120, 122 identical, the maximum diameter of the peeling head 100 may also be larger than the diameter of both guide elements. This setting guarantees a proper and even peeling result after only one passage.

However, the guide elements 120 and 122 allow users to achieve a precise and even peeling action so that the peeling tool 10 will strip the pipe surface evenly and create a plane surface.

The rotational direction of the peeling head 100 does not influence the peeling result.

However, results may vary with the personal tilt of the user. It is then necessary to adjust the peeling blades 112 to the rotational direction of the peeling head 100.

If the user employs an angle grinder as a drive 200 as shown in FIG. 1, the angle grinder's spray guard may be used as safety cover 160 after installing the first cover section 162 separately. Of course, the existing spray guard may also be removed and a complete safety cover 160 for the first and second section 162, 164 may be installed in its place. The safety cover may also be adjustable over the circumference of the equipment. This makes it possible to adjust the cover as needed to optimally protect users in various work situations.

The material of our choice for most components of the peeling head 100 is metal due to its superior resilience. The peeling tool 10 is mostly used to finish plastic pipes. Therefore we consider a cover 160 made of a suitable plastic material adequate.

In the above described embodiment of the invention, the larger extending peeling blades 112 defining the maximum diameter of the peeling head 100 are described as straight blades with a linear cutting edge 114, which is at least approximately aligned parallel to the longitudinal axis A of the drive shaft 130. Of course, one or several peeling blades may have non-linear cutting edges. The edge may for example be spiral-shaped and may at least in part be arranged to extend around the blade shaft 110.

The guide elements 120, 122 are not exposed to wear and tear and can therefore be made of plastic. In case the guide elements 120, 122 are made of PTFE (polytetrafluoroethylene) and therefore slide easily, fixed guide elements may be used, which do not move when the drive 200 or the casing moves.

The design may further include exchangeable guide elements 120 and 122 so that the peeling tool 10 can be adjusted to different pipe diameters and/or peeling depths S.

The invention claimed is:

1. A peeling tool for the at least partial peeling of the outer surface layer of rotationally symmetric objects, in particular cylindrical plastic pipes, the peeling tool comprising:
 a peeling head, a drive shaft with a longitudinal axis, and a cylindrical blade roller mounted coaxially on the drive shaft and turning with it, with the blade roller containing at least one installed peeling blade with a cutting edge extending above the blade roller surface and defining the maximum outer diameter of the peeling head, and;
 two cylindrical guide elements with longitudinal axes, the guide elements being located at the face sides of the blade roller in a coaxial configuration relative to the blade roller;
 wherein the first guide element has a diameter equal to the maximum diameter of the peeling head and the second guide element is smaller than the first guide element, and;
 wherein the first and second guide elements are seated around their longitudinal axis independent of the blade roller and can be rotated.

2. Peeling tool according to claim 1, wherein the first and second guide elements are seated on the drive shaft and can be rotated.

3. Peeling tool according to claim 1, wherein the width of the guide elements is smaller than the width of the blade roller.

4. Peeling tool according to claim 1, wherein the guide elements and the blade roller are made of metal.

5. Peeling tool according to claim 1, wherein the cover is positioned parallel to the blade roller, which covers the blade roller and the guide elements at least almost completely in an axial direction and extends over at least a section in a circumferential direction.

6. Peeling tool according to claim 1, wherein the drive shaft features a first end with an adapter enabling the connection of a drive.

7. Peeling tool according to claim 6, wherein the drive is an electric motor.

8. Peeling tool according to claim 6, wherein the drive is an electric device, such as an angle grinder or a drill.

9. Peeling tool according to claim 6, wherein the drive shaft has a second end with an intended bearing element.

10. Peeling tool according to claim 9, wherein the second end of the drive shaft is seated in the bearing element and is able to rotate.

11. Peeling tool according to claim 8, wherein the bearing element features a torque support, which allows it to lock the bearing element in the position on the frame of the drive.

12. Peeling tool according to claim 9, wherein the bearing element features a handle.

13. Peeling tool according to claim 1, wherein the diameter of the first guide element is smaller than the first guide element by twice the peeling depth of the material to be peeled off the rotationally symmetric object.

* * * * *